J. M. Smith. Plow.
No. 121,676.
Patented Dec. 5, 1871.
*Fig. 1.*
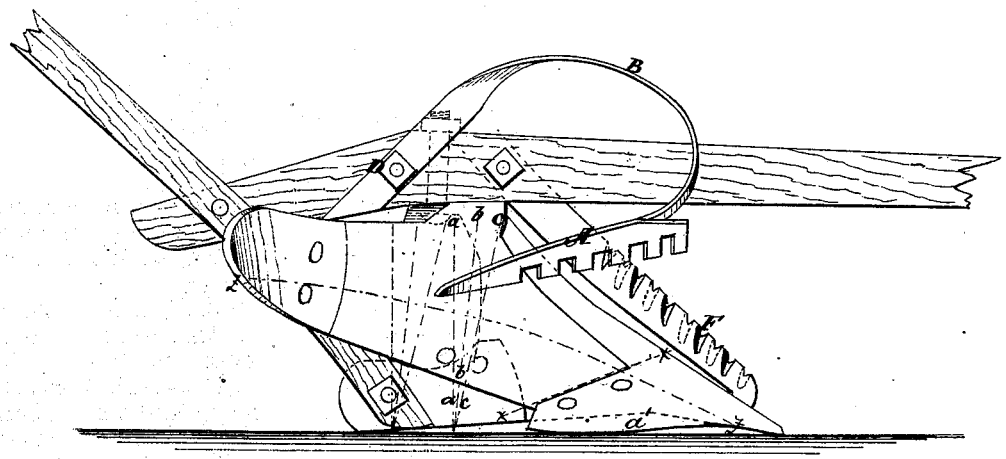
*Fig. 3.   Fig. 4.   Fig. 5.*
*Fig. 2.*
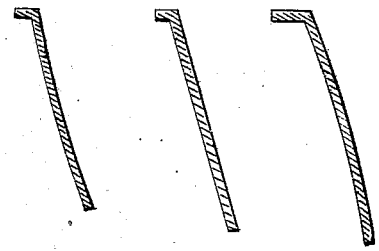
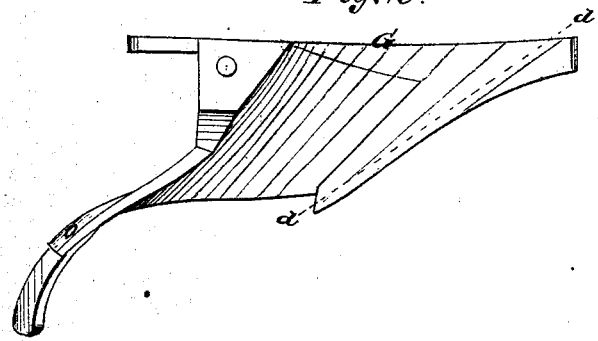
*Fig. 6.*
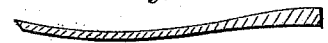
Witnesses:
E. Wolff.
Wm. H. C. Smith.
*Fig. 7.*
Inventor:
J. M. Smith.
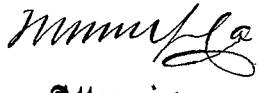
Per
Attorneys.

121,676

UNITED STATES PATENT OFFICE.

JUSTIN MALANCEN SMITH, OF HADDAM NECK, CONNECTICUT.

IMPROVEMENT IN PLOWS.

Specification forming part of Letters Patent No. 121,676, dated December 5, 1871.

*To all whom it may concern:*

Be it known that I, JUSTIN MALANCEN SMITH, of Haddam Neck, in the county of Middlesex and State of Connecticut, have invented a new and useful Improvement in Plows; and I do hereby declare that the following is a full, clear, and exact description thereof, which will enable others skilled in the art to make and use the same, reference being had to the accompanying drawing forming part of this specification.

This invention relates to improvements in plows; and it consists in a construction of the share and mold-board calculated to cause the furrow-slice to discharge or pass over the mold-board more easily than with the common mold-boards; also, to be pulverized and disintegrated at the same time, and to be turned over more completely. It also consists in a self-sharpening toothed colter, the same being an improvement on that for which Letters Patent of the United States were allowed me August 30, 1870.

Figure 1 is a side elevation of my improved plow. Fig. 2 is a top view with the beam and handles removed. Fig. 3 is a section on the line *a a*. Fig. 4, a section on the line *b b*; Fig. 5, a section on the line *c c*; Fig. 6, a section on the line *d d*; and Fig. 7, a section on the line *f f*.

Similar letters of reference indicate corresponding parts.

The plows as now made cut the furrow-slice flat and level on the bottom, and the mold-boards, which are concave in the cross-sections, have the effect to compress the upper portion of the furrow-slice together, so that it is prevented from crumbling and disintegrating, as it is desirable that it should. Another result is, that the furrow-slice bears mostly on the surface of the mold-board near the upper and lower edges, passing lightly over the center portion, or not touching it at all, whereby the earth clogs thereat and prevents the free action required. Now I propose to make the share convex on the bottom, so as to cut the lower side of the slice concave, and to shape the mold-board so that it will be convex in the cross-section, whereby this compression of the furrow-slice will not only be avoided, but the tendency of the concave under surface of the furrow-slice resting on the convexity of the mold-board will be to cause the said slice to separate vertically by the overhanging sides, and become disintegrated. The clogging will also be prevented at the center, and there will be no clogging either side of the center, for the slice breaking down will bear on the mold-board sufficiently to prevent it.

The convexity of the bottom of the share is represented at *a*, Fig. 1. It is also indicated by the sectional Fig. 6, showing the front of the share concaved, by which the convex bottom is formed; but this concavity changes into a flat surface, or nearly so, where the share joins on the lower end of the mold-board at the line *f f*. This concavity causes the furrow-slice to be carried more directly up the mold-board before turning, so that the lower edge is not forced against the previously-turned furrow, thereby greatly reducing the resistance. The section, Fig. 3, on the vertical line *a*, indicates a slight concavity of the mold-board; while the section, Fig. 4, being on the line *b b*, shows a flat surface thereat; and the section, Fig. 5, in the line *c c*, shows a convex surface. The plane of the section *c c* is about sixty degrees to the earth; the plane of section *b b* about seventy-five, and the plane of section *a* vertical. The same relation of the spiral form of the mold-board with the line of draft is preserved throughout the whole length or nearly so, except that the section-lines showing the same shapes (Figs. 3, 4, and 5) would be a little nearer together as the outer end is approached, being occasioned by the mold-board being carried forward on its upper edge more at and near the outer end than at the more forward parts, for more easily turning the furrow-slice, the lower edge being correspondingly dropped or turned under. The track or undisturbed earth at the bottom of the furrow is left concave by my plow, and the up-turned surfaces of the furrow-slices would appear correspondingly convex if their convexity were not reduced by reason of the disintegration caused by their passage over the convex surface of the rear half of the mold-board. G indicates an extension of the share along the front of the mold-board, and has a sharp edge thereat designed to operate as a colter when no other is used, as will be the case in old ground. A is a notched or toothed grass-turning instrument, suspended in an oblique position in front of the mold-board by means of a bent and twisted bar, B, which is bolted to the beam D. The share is provided with an extension, G, along the front of the mold-board, where it joins the land-side to the top, having the sharp edge usually made at the junction of the said two parts to constitute a detachable cutter thereat, which may be renewed as often as the share is renewed, while under the ordinary arrangement, when this edge is once worn off it cannot be renewed as long as the plow is used. The plows are subject to great wear at this point, and when made of cast-iron soon wear off blunt, and thenceforth require much more power to work them besides being more liable to clog. The grass-turning instrument consists of the bar A, suspended in an oblique position in front of the mold-board and about parallel with the part of said board which it fronts, a slight distance above the surface of the ground, so as to come against the grass and weeds just above the roots and in advance of the furrow-slice at the part where it begins to rise on the mold-board. The said bar is suspended in this case by the bent and twisted spring-bar B, bolted to the side of the beam at D, so that it can be vibrated on the bolt to raise and lower the said bar A. This bar A is notched at the rear and lower edge for holding the grass evenly along it and confining it so as to turn down in the line of the furrow. It may, however, be used with good results without the notches, and I propose to use it so if found best.

The improvement in the construction of the teeth of the colter consists in forming said teeth in the knife-edged colter by means of the grooves F, in the sides beginning at the edge, extending nearly to the rear, terminating in a point vanishing in the surfaces, being alternately on opposite sides, so that the knife-edge of each tooth is subject to wear on both sides alike, by which the edge is preserved as the colter wears away. These grooves are inclined in the transverse direction of the colter, so that when in position they will be nearly vertical, and the earth in passing them will move upward through them to some extent in such manner as to keep them from clogging.

Having thus described my invention, I claim as new and desire to secure by Letters Patent—

1. The combination of the share, provided with the downwardly-convex cutting-edge and concave upper surface, with the convex mold-board, as and for the purpose specified.

2. The plow-share having the the downwardly-convex cutting-edge, and the concave upper surface at and above the the said cutting-edge, but changing to a flat surface, or thereabout, at the junction with the mold-board, substantially as specified.

3. The improved colter, having self-sharpening teeth formed by grooves F, alternating on opposite sides of the same, as specified.

JUSTIN MALANCEN SMITH.

Witnesses:
WILLIAM C. SELDEN,
H. M. SELDEN. (114)